(12) United States Patent
Yin et al.

(10) Patent No.: US 6,389,442 B1
(45) Date of Patent: May 14, 2002

(54) EFFICIENT FINITE FIELD MULTIPLICATION IN NORMAL BASIS

(75) Inventors: Yiqun L. Yin, San Mateo, CA (US); Peng Ning, Fairfax, VA (US)

(73) Assignee: RSA Security Inc., Bedford, MA (US)

( * ) Notice: Subject to any disclaimer, the term of this patent is extended or adjusted under 35 U.S.C. 154(b) by 0 days.

(21) Appl. No.: 09/221,556

(22) Filed: Dec. 28, 1998

Related U.S. Application Data

(60) Provisional application No. 60/070,193, filed on Dec. 30, 1997.

(51) Int. Cl.$^7$ .................................................. G06F 7/00
(52) U.S. Cl. .......................................... 708/492; 380/28
(58) Field of Search ................................ 708/491, 492; 380/28, 30

(56) References Cited

U.S. PATENT DOCUMENTS

| | | |
|---|---|---|
| 4,037,093 A | 7/1977 | Gregg et al. |
| 4,162,480 A | 7/1979 | Berlekamp |
| 4,251,875 A | 2/1981 | Marver et al. |
| 4,587,627 A | 5/1986 | Omura et al. |
| 4,745,568 A | 5/1988 | Onyszchuk et al. |
| 4,873,688 A | 10/1989 | Maki et al. |
| 5,313,530 A | 5/1994 | Iwamura |
| 5,414,719 A | 5/1995 | Iwaki et al. |
| 5,642,367 A | 6/1997 | Kao |
| 5,689,452 A | 11/1997 | Cameron |
| 5,787,028 A | 7/1998 | Mullin |
| 5,812,438 A | 9/1998 | Lan et al. |
| 5,854,759 A | 12/1998 | Kaliski, Jr. et al. |
| 6,003,057 A | 12/1999 | Dworkin et al. |
| 6,038,581 A | 3/2000 | Aoki et al. |
| 6,049,815 A | 4/2000 | Lambert et al. |

FOREIGN PATENT DOCUMENTS

| | | |
|---|---|---|
| EP | 0 741 355 A1 | 11/1996 |
| JP | 01181232 | 7/1989 |

OTHER PUBLICATIONS

Rosing. Implementing Elliptic Curve Cryptography: Source Code [online]. Manning Publications Co., no publication date provided [retrieved in May 2001]. Retrieved from the Internet: <URL: http://www.manning.com/Rosing/source-.html> onb.c (dated Jun. 7, 1997).

(List continued on next page.)

*Primary Examiner*—Ohuong Dinh Ngo

(57) ABSTRACT

The invention provides improved techniques for multiplication of signals represented in a normal basis of a finite field. An illustrative embodiment includes a first rotator which receives a first input signal representative of a first normal basis field element ($a_0$ $a_1$ ... $a_{m-1}$), and a second rotator which receives a second input signal representative of a second normal basis field element ($b_0$ $b_1$ ... $b_{m-1}$). A word multiplier receives output signals from the first and second rotators, corresponding to rotated representations of the first and second elements, respectively, and processes the rotated representations w bits at a time to generate an output signal representative of a product of the first and second elements, where w is a word length associated with the word multiplier. The rotated representation of the first element may be given by $A[i]=(a_i\ a_{i+1}\ ...\ a_{i+w-1})$, the rotated representation of the second element may be given by $B[i]=(b_i\ b_{i+1}\ ...\ b_{i+w-1})$, and the product may be given by $c=(C[0], C[w], C[2w], ..., C[m-w])$, where $C[i]=(c_i\ C_{i+1}\ ...\ c_{i+w-1})$, m is the degree of the finite field, w is the word length, and $i=0, 1, ...\ m-1$. The invention is particularly well suited for implementation in software, and can provide performance advantages for both general normal basis and optimal normal basis.

16 Claims, 4 Drawing Sheets

OTHER PUBLICATIONS

Agnew et al., "Arithmetic Operations in GF($2^m$)", *Journal of Cryptology*, vol. 6, pp. 3–13 (1993).

De Win et al., "A Fast Software Implementation for Arithmetic Operations in GF($2^n$)", *Advances in Cryptology—ASIACRYPT '96 : International Conference on the Theory and Applications of Cryptology and Information Security*, pp. 65–76 (Nov. 3–7, 1996).

Laws et al., "A Cellular–Array Multiplier for GF($2^m$)", *IEEE Transactions on Computers*, vol. C–20, No. 12, pp. 1573–1578 (Dec. 1971).

Menezes et al., "Elliptic Curve Cryptosystems and Their Implementation", *Journal of Cryptology*, vol. 6, pp. 209–224 (1993).

Menezes (ed.), *Applications of Finite Fields*, Kluwer Academic Publishers (1993).

Menezes, *Elliptic Curve Public Key Cryptosystems*, Klunwer Academic Publishers, pp. 15–34 (1993).

Morrii et al., "Efficient Construction of Gate Circuit for Computing Multiplicative Inverses over GF($2^m$)", *The Transactions of the IEICE*, vol. 72, No. 1, pp. 37–42 (Jan. 1989).

Nyberg, "Differentially Uniform Mappings for Cryptography", *Advances in Cryptology—EUROCRYPT '93: Workshop on the Theory & Application of Cryptographic Techniques*, pp. 55–61 (May 23–27, 1993).

Nyberg et al., "Provable Security Against a Differential Attack", *Journal of Cryptology*, vol. 8, pp. 27–37 (1995).

Oorschot et al., "A Geometric Approach to Root Finding in GF($q^m$)", *IEEE Transactions on Information Theory*, vol. 35, No. 2, pp. 444–453 (Mar. 1989).

Pekmestzi et al., "A Two's Complement Cellular Array Multiplier", *The Radio and Electronic Engineer*, vol. 51, No. 2, pp. 94–96 (Feb. 1981).

Pincin, "A New Algorithm for Multiplication in Finite Fields", *IEEE Transactions on Computers*, vol. 38, No. 7, pp. 1045–1049 (Jul. 1989).

Rosing, *Implementing Elliptic Curve Cryptography*, Manning Publications Co., pp. 47–127 (1999).

Schneier, *Applied Cryptography*, 2nd ed., John Wiley & Sons, Inc., pp. 242–244 (1996).

Wang et al., "VLSI Architectures for Computing Multiplications and Inverses in GF($2^m$)", *IEEE Transactions on Computers*, vol. C–34, No. 8, pp. 709–717 (Aug. 1985).

Yeh et al., "Systolic Multipliers for Finite Fields GF($2^m$)", *IEEE Transactions on Computers*, vol. C–33, No. 4, pp. 357–360 (Apr. 1984).

EFFICIENT FINITE FIELD MULTIPLICATION IN NORMAL BASIS

RELATED APPLICATION

The present application claims the priority of U.S. Provisional Application Ser. No. 60/070,193 filed in the name of inventors Yiqun Lisa Yin and Peng Ning on Dec. 30, 1997 and entitled "Efficient Software Implementation for Finite Field Multiplication in Normal Basis."

FIELD OF THE INVENTION

The present invention relates generally to information processing systems and devices, such as cryptographic systems and devices, which include a capability for multiplying signals of a finite field having a normal basis.

BACKGROUND OF THE INVENTION

Finite field arithmetic operations are becoming increasingly important in today's computer systems, particularly for cryptographic processing applications. Among the more common finite fields used in cryptography are odd-characteristic finite fields of degree 1, conventionally known as GF(p) arithmetic or arithmetic modulo a prime, and even-characteristic finite fields of degree greater than 1, conventionally known as $GF(2^m)$ arithmetic (where m is the degree). $GF(2^m)$ arithmetic is further classified according to the choice of basis for representing elements of the finite field; two common choices are polynomial basis and normal basis.

It is known that multiplication in normal basis, particularly in optimal normal basis (ONB), can be implemented efficiently in hardware. However, little attention has been devoted to implementing normal basis multiplication efficiently in software. A number of difficulties have prevented the development of fast software implementation of normal basis multiplication. First, when multiplying two elements represented in normal basis according to the standard formula, the coefficients of their product need to be computed one bit at a time. Second, the computation of a given coefficient involves a series of arithmetic operations which need to be performed sequentially in software, while in hardware, they can be easily parallelized.

We will first define some basic notation for a finite field $GF(2^m)$ and its representation in normal basis. Then, we will describe conventional multiplication formulas for both general normal basis and ONB. Let w denote the word size in bits. For a typical software implementation, we have w=32. Let m be a positive integer. For simplicity, we assume that w|m. The finite field $GF(2^m)$ consists of $2^m$ elements, with certain rules for field addition and multiplication. The finite field $GF(2^m)$ has various basis representations including normal basis representation. A binary polynomial is a polynomial with coefficients in GF(2). A binary polynomial is irreducible if it is not the product of two binary polynomials of smaller degree. For simplicity, we will refer to such a polynomial an irreducible polynomial. Irreducible polynomials exist for every degree m and can be found efficiently. Let g(x) be an irreducible polynomial of degree m. If β is a root of g(x), then the m distinct roots of g(x) in $GF(2^m)$ are given by $$B=\{\beta, \beta^2, \beta^{2^2}, \ldots, \beta^{2^{m-1}}\}.$$

If the elements of B are linearly independent, then g(x) is called a normal polynomial and B is called a normal basis for $GF(2^m)$ over GF(2). Normal polynomials exist for every degree m. Given any element a $\in GF(2^m)$, one can write $$a = \sum_{i=0}^{m-1} a_i \beta^{2^i}, \text{ where } a_i \in \{0, 1\}.$$

In normal basis, field multiplication is generally carried out using a multiplication matrix, which is an m-by-m matrix M with entries in GF(2). Details on how to compute matrix M from g(x) are known in the prior art, e.g., A. Menezes et al., "Applications of Finite Fields," Kluwer Academic Publishers, 1993, and IEEE Standard for Public-Key Cryptography, http://stdsbbs.ieee.org/groups/1363/index.html. Other details regarding conventional finite field arithmetic techniques can be found in, e.g., U.S. Pat. No. 4,587,627 issued May 6, 1986 to J. L. Massey and J. K. Omura, entitled "Computational method and apparatus for finite field arithmetic," and G.B. Patent No. 2,176,325 issued Dec. 17, 1986 to R. C. Mullin, I. M. Onyszchuk, and S. A. Vanstone, entitled "Finite field multiplication in a cryptographic system—offsetting suffixes and rotating binary digits in respective shift registers so as to produce all product vector terms simultaneously" (related U.S. Pat. No. 4,745,568 was issued May 17, 1988).

Below, we describe a conventional normal basis multiplication formula in two slightly different formats. Let $a=(a_0 \, a_1 \ldots a_{m-1})$ and $b=(b_0 \, b_1 \ldots b_{m-1})$ be two elements. Then their product $c=(c_0 \, c_1 \ldots c_{m-1})$ can be computed one bit at a time as follows:

$$c_0 = (a_0 \, a_1 \ldots a_{m-1}) M (b_0 \, b_1 \ldots b_{m-1})^T$$
$$c_1 = (a_1 \, a_2 \ldots a_0) M (b_1 \, b_2 \ldots b_0)^T$$
$$c_{m-1} = (a_{m-1} \, a_0 \ldots a_{m-2}) M (b_{m-1} \, b_0 \ldots b_{m-2})^T \quad (1)$$

In formula (1), when a new coefficient $c_k$ needs to be computed, the coefficients of both a and b are rotated to the left by one bit. This allows efficient hardware implementations of normal basis multiplication.

In a typical "C" programming language implementation of formula (1), a, b, and columns of M are all stored in words. Each matrix-vector multiplication $M(b_0 \, b_1 \ldots b_{m-1})^T$ can be carried out with (m/2)(m/w) exclusive-or operations on average, and hence the total number of word operations for computing c is about m(m/2) (m/w)=$m^3$/2w. Note that the computation time is independent of the number of non-zero entries in M.

Let $M_{ij}$ denote the entries of matrix M. The following is another way of writing formula (1):

for k from 0 to m−1

$$c_k = \Sigma_{i=0,\ldots m-1} a_{i+k} \bullet (\Sigma_{j=0,\ldots m-1} M_{ij} \bullet b_{j+k}). \quad (2)$$

Throughout the description, the addition operation "+" in a subscript is to be understood as addition modulo the degree m, unless otherwise specified; the symbol "•" denotes AND; and the symbols "Σ" and "⊕" denote exclusive-or. In formula (2), essentially the same expression is used for each coefficient $c_k$. More specifically, given the expression for $c_k$, we simply increase the subscripts of a and b by one (modulo m) and the result is the expression for $c_{k+1}$.

Using formula (2), the fewer 1's in the multiplication matrix M, the faster a field multiplication can be done. An ONB is a normal basis which has the smallest number of 1's in the multiplication matrix M. There are two kinds of ONB, called type I ONB and type II ONB, that differ in the mathematical formulae which define them. For both types of ONB, the multiplication matrix has exactly 2m−1 non-zero entries. In particular, the first row has a single non-zero entry, and the rest of the rows have exactly two non-zero entries. In terms of formula (2), the total number of terms (of the form $a_i M_{ij} b_j$) for each $c_k$ is 2m−1. ONBs only exist for certain values of degree m. For example, in the range [150, 200], there are only 15 values of m for which an ONB exists.

It is an object of the present invention to provide improved techniques for multiplication in a normal basis, which are particularly well suited for implementation in software, and can be applied to both general normal basis and ONB.

SUMMARY OF THE INVENTION

The invention provides improved techniques for implementing normal basis multiplication in processing systems and devices. The techniques are particularly well suited for implementation in software. Using the invention, the coefficients of a product of field elements can be computed one processor word at a time, e.g., 32 bits in a 32-bit processor, as opposed to one bit at a time as required by certain conventional approaches, thereby fully taking advantage of the fast word-based operations currently available in modern processors and software.

An illustrative embodiment of the invention includes a first rotator which receives a first input signal representative of a first normal basis field element ($a_0\ a_1\ \ldots\ a_{m-1}$), and a second rotator which receives a second input signal representative of a second normal basis field element ($b_0\ b_1\ \ldots\ b_{m-1}$). A word multiplier receives output signals from the first and second rotators, corresponding to rotated representations of the first and second elements, respectively, and processes the rotated representations w bits at a time to generate an output signal representative of a product of the first and second elements, where w is a word length associated with the word multiplier. The rotated representation of the first element may be given by $A[i]=(a_i\ a_{i+1}\ \ldots\ a_{i+w-1})$, the rotated representation of the second element may be given by $B[i]=(b_i\ b_{i+1}\ \ldots\ b_{i+w-1})$, and the product may be given by c=(C[0], C[w], C[2w], . . . , C[m−w]), where $C[i]=(c_i\ c_{i+1}\ \ldots\ c_{i+w-1})$, m is the degree of the finite field, w is the word length, and i=0, 1, . . . m−1.

In accordance with another aspect of the invention, the performance of a normal basis multiplier can be further improved by precomputing and storing certain elements of the rotated representations, such as elements A[i+wt] and B[i+wt], where t=0, 1, . . . m/w−1. For example, if $A[i+m]=A[i]=(a_i\ a_{i+1}\ \ldots\ a_{i+w-1})$ and $B[i+m]=B[i]=(b_i\ b_{i+1}\ \ldots\ b_{i+w-1})$, the array A may be precomputed as A[0], A[1], . . . , A[m−1], A[m], A[m+1], . . . , A[2m−1], and the array B may be precomputed as B[0], B[1], . . . , B[m−1], B[m], B[m+1], . . . , B[2m−1], such that each of array A and B include 2m elements of length w. Words 0 through m−1 in A and B are then used in computing C[0], words w through w+m−1 in A and B are used in computing C[w], and the remaining elements C[2w], . . . , C[m−w] of the product c are computed in the same manner. Further improvements can be provided in the case of an optimal normal basis (ONB) by, for example, precomputing two arrays, B1[i+m]=B1[i]=B[mult-array[2*i−1]] and B2[i+m]=B2[i]=B[mult-array[2*i]], for the rotated representation B, such that A, B1, and B2 can be accessed sequentially, where mult-array is an array with 2m−1 entries and is a compact representation of the multiplication matrix M.

The invention provides improved performance for both general normal basis and ONB. For example, for both type I ONB and type II ONB, the number of word operations involved for computing c is roughly $(m/w)(3m)=3m^2/w$. Compared with conventional $m^3/2w$ operations using standard formula (1), the invention can improve computational speed by a factor on the order of m/6. Although the illustrative embodiment described above is particularly well suited for use in software configured to run on a conventional computer with a 32-bit or 64-bit processor, the invention can be implemented in computers or other systems or devices with other word lengths, including, e.g., embedded systems such as pagers, digital notepads or palmtop computers with 8-bit processors. As another example, although the illustrative embodiment involves multiplication of two field elements, the techniques of the invention can be extended in a straightforward manner to multiplication of more than two field elements. These and other features of the present invention will become more apparent from the accompanying drawings and the following detailed description.

DETAILED DESCRIPTION OF THE INVENTION

Figure 1:
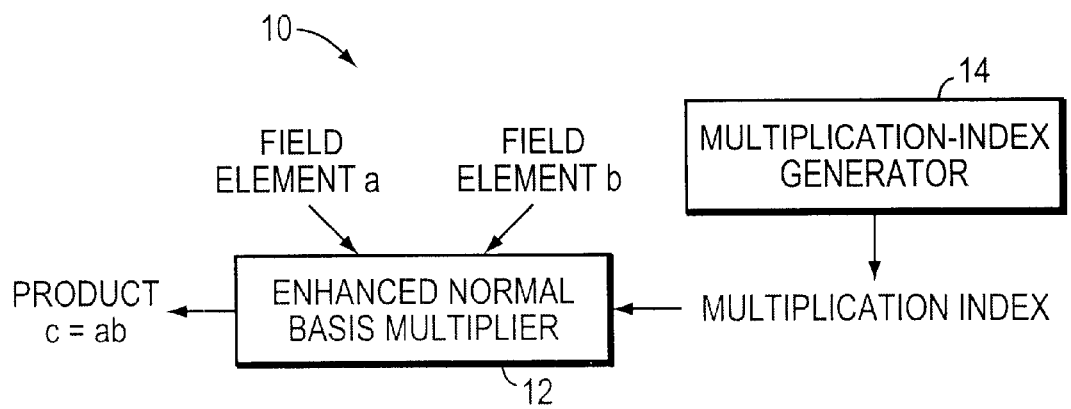
FIG. 1 shows an illustrative embodiment of an enhanced normal basis multiplication unit in accordance with the invention.

The present invention provides new approaches for implementing finite field multiplication in normal basis. The techniques of the invention are particularly well suited for implementation in software. The invention will initially be illustrated as a basic approach for general normal basis. Then, some further optimization with pre-processing will be described. Finally, application of the basic approach to ONB will be described.

Suppose we want to compute c=ab in normal basis. For i=0, . . . m−1, we define $$A[i]=(a_i\ a_{i+1}\ \ldots\ a_{i+w-1}),$$

$$B[i]=(b_i\ b_{i+1}\ \ldots\ b_{i+w-1}),$$

$$C[i]=(c_i\ c_{i+1}\ \ldots\ c_{i+w-1}),$$

In other words, each A[i] has length w and corresponds to the successive blocks of a in a wrap-around fashion, and similarly for B[i] and C[i]. Note that c=(C[0], C[w], C[2w], . . . , C[m−w]). Hence, in order to compute c, we only need to compute C[0], C[w], C[2w], . . . , C[m−w]. Given the above definitions, we can rewrite formula (2) as follows:

for t from 0 to (m/w−1)

$$C[wt] = \Sigma_{i=0,\ldots,m-1} A[(i+wt) \bmod m] \cdot (\Sigma_{j=0,\ldots,m-1} M[ij] \cdot B[(j+wt) \bmod m]), \quad (3)$$

As an example illustrating the operation of formula (3), assume m=160 and w=32, which results in the following five equations:

$$C[0] = \Sigma_{i=0,\ldots,m-1} A[i] \cdot (\Sigma_{j=0,\ldots,m-1} M[ij] \cdot B[j]),$$

$$C[32] = \Sigma_{i=0,\ldots,m-1} A[(i+32) \bmod m] \cdot (\Sigma_{j=0,\ldots,m-1} M[ij] \cdot B[(j+32) \bmod m]),$$

$$C[64] = \Sigma_{i=0,\ldots,m-1} A[(i+64) \bmod m] \cdot (\Sigma_{j=0,\ldots,m-1} M[ij] \cdot B[(j+64) \bmod m]),$$

$$C[96] = \Sigma_{i=0,\ldots,m-1} A[(i+96) \bmod m] \cdot (\Sigma_{j=0,\ldots,m-1} M[ij] \cdot B[(j+96) \bmod m]),$$

$$C[128] = \Sigma_{i=0,\ldots,m-1} A[(i+128) \bmod m] \cdot (\Sigma_{j=0,\ldots,m-1} M[ij] \cdot B[(j+128) \bmod m]).$$

It can be seen that the number of equations in formula (3) is only m/w, while the number of equations in formula (2) is m. In particular, one equation in formula (3) corresponds to w consecutive equations in formula (2).

In a C implementation of formula (3) in accordance with the invention, "•" may be carried out as an AND operation between two words, and "Σ" may be carried out as an exclusive-or operation between two words. Hence, using formula (3), we can compute w bits of c at the same time. For general normal basis, the total number of word operations for computing c is roughly (m/w) times the number of non-zero entries in M. Unlike formula (1), the number of operations in formula (3) depends on the number of non-zero entries in M. In particular, the fewer the number of non-zero entries, the faster the running time will be. Hence, formula (3) will provide good performance when M is sparse, especially when the basis is ONB.

The following gives an illustrative implementation of formula (3) in C.

```
for (t=0; t<(m/w); t++)
{
C[w*t]=0;
for (i=0; i<m; i++)
{
   temp=0;
   for (j=0; j<m; j++)
   {
      if (M[i,j]==1)
         temp ⊕=B[(j+w*t)% m];
   }
   C[w*t]⊕=A[(i+w*t)%m] & temp;
}
}
```

We can also interchange the summations for t and i in formula (3) and rewrite the formula as follows:

for t from 0 to (m/w−1)
C[wt]=0
for i from 0 to m
for t from 0 to (m/w−1)

$$C[wt] = C[wt] \oplus (A[(i+wt) \bmod m] \cdot (\Sigma_{j=0,\ldots,m-1} M[ij] \cdot B[(j+wt) \bmod m])) \quad (4)$$

The number of operations for formula (4) is similar to that of formula (3). Depending on the particular implementation and processor, one might yield better performance than the other.

For both formulas (3) and (4), we note that the computation of each word (A[i], B[i], for i =0, . . . , m−1) involves one left shift, one right shift, and one exclusive-or. Once precomputation for A and B is done, rotations of the bits of A and B are no longer needed during the entire computation of c, thus significantly improving the performance.

We can further speed up the above-described basic approach by precomputing and storing A[i] and B[i] in the following manner. We first extend the definition of array A and B as follows: For i=0, . . . m−1, we define $$A[i+m] = A[i] = (a_i \ a_{i+1} \ \ldots \ a_{i+w-1}),$$

$$B[i+m] = B[i] = (b_i \ b_{i+1} \ \ldots \ b_{i+w-1}).$$

(It should be noted that in this case, the addition in A[i+m] and B[i+m] is a real addition without modulo m.) We precompute array A and B, each of which consists of 2m elements of length w:

$$A[0], A[1], \ldots, A[m-1], A[m], A[m+1], \ldots, A[2m-1],$$

$$B[0], B[1], \ldots, B[m-1], B[m], B[m+1], \ldots, B[2m-1],$$

Given A and B, we can improve the C code given previously:

```
for (k=0; k<m; k+=w)
{
C[k]=0;
for (i=0; i<m; i++)
{
   temp=0;
   for (j=0; j<m; j++)
   {
      if (M[i,j]=1)
         temp ⊕=B[j];
   }
   C[k]⊕=A[i] & temp;
}
A+=w;
B+=w;
}
```

The above code operates as follows: When computing C[0], we use word 0 through m−1 in array A and B (that is, the first m words). When computing C[w], we use word w through w+m−1 in array A and B, which is accomplished by pointer jumping. Similarly, we can compute C[2w], . . . , C[m−w].

Application of the basic approach to ONB will now be described. For ONB, since most of the entries in the multiplication matrix M are zero, we can store M in a more compact way using an array called mult-array defined as follows:

```
k=0;
for (i=0; i<m; i++){
   for (j=0; j<m; i++){
      if (M[i,j]=1){
         mult-array[k]=j;
         k++;
      }
   }
}
```

The C code given previously can be further simplified using the fact that the inner loop j no longer exists, since it only involves one or two elements of B.

```
for (k=0; k<m; k+=w)
{
temp=A[0] & B[mult-array[0]];
```

```
for (i=1; i<m; i++)
{
   temp ⊕=A[i] & (B[mult-array [2*i−1]]+B[mult-array
      [2*i]]);
}
C[k]=temp;
A+=w;
B+=w;
}
```

For both type I ONB and type II ONB, the number of word operations involved for computing c is roughly (m/w) (3m)=$3m^2$/w. Compared with conventional $m^3$/2w operations using standard formula (1), the invention can provide a factor of approximately m/6 improvement in speed. Note that the improvement is independent of the word size w. An illustrative implementation of the invention with m=160 and w=32 showed a factor of 20 improvement. It should be noted that further improvements may be made to the code given above. For example, the code can be further improved by precomputing two separate arrays for the representation B:

$$B1[i+m]=B1[i]=B[\text{mult-array }[2*i-1]]$$

$$B2[i+m]=B2[i]=B[\text{mult-array }[2*i]],$$

such that the arrays A, B1, and B2 can be accessed sequentially.

FIG. 1 shows an enhanced normal basis multiplication unit 10 in accordance with an illustrative embodiment of the invention. The multiplication unit 10 includes an enhanced normal basis multiplier 12 and a multiplication index generator 14. The multiplication index generator 14 outputs a multiplication index, which may be, e.g., a matrix or an array that represents a matrix. The normal basis multiplier 12 takes as inputs two field elements a, b, and the multiplication index from generator 14, and outputs a field element c which is the product of elements a and b in normal basis. The multiplication index only needs to be computed once for a given normal basis of the finite field, and a given sequence of field multiplication (i.e., c=ab) can then be performed using the same multiplication index.

Figure 2A:
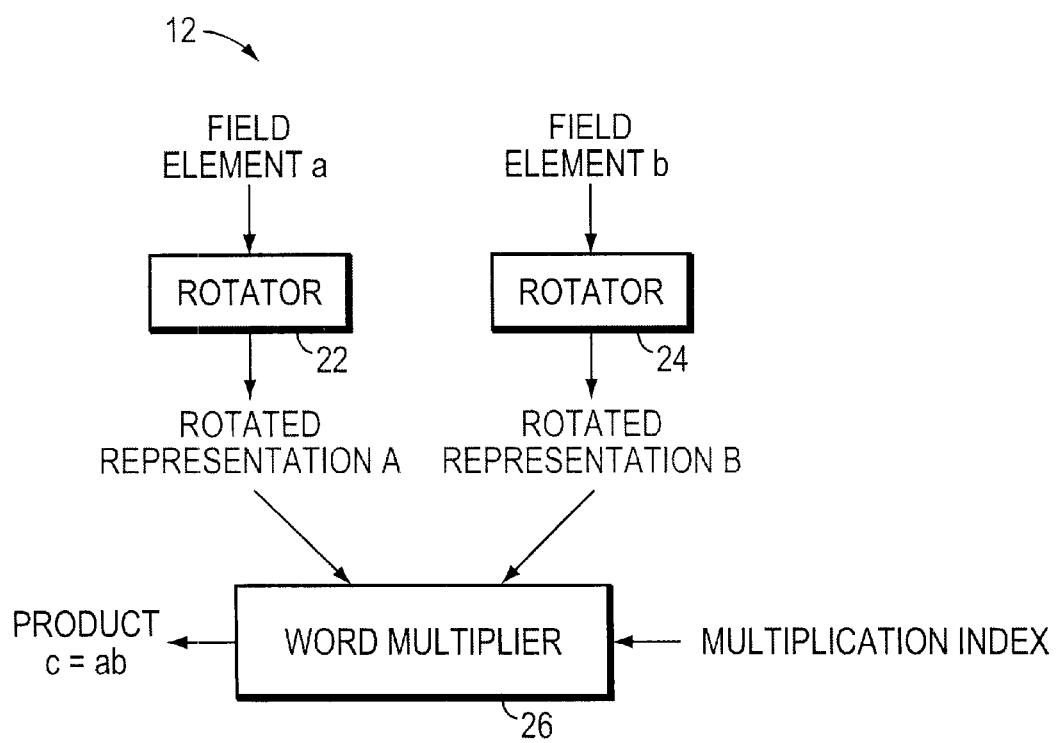
FIGS. 2A and 2B show illustrative embodiments of enhanced normal basis multipliers for use in the multiplication unit of FIG. 1, for general normal basis and optimal normal basis (ONB), respectively.
Figure 2B:
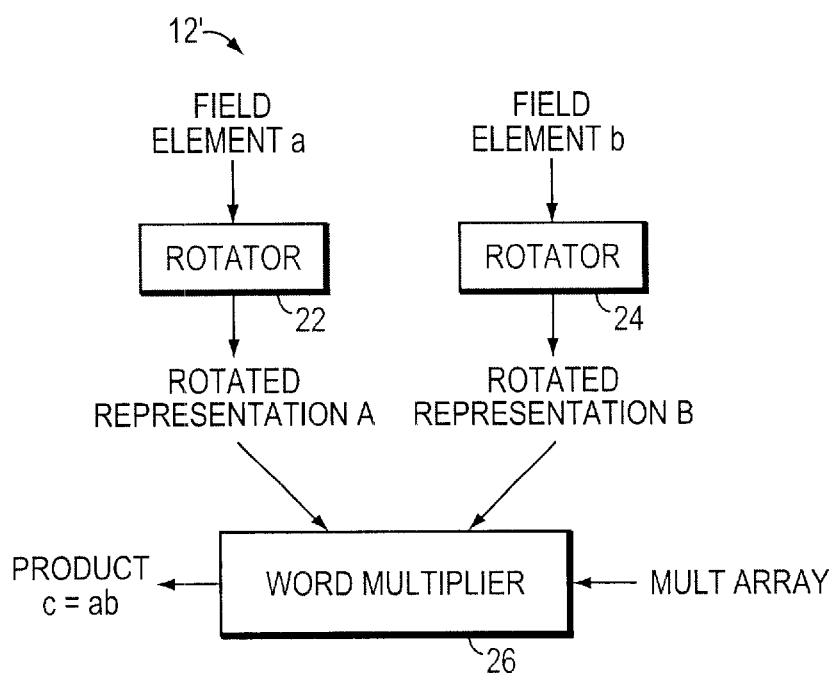

FIGS. 2A and 2B show more detailed block diagrams of the enhanced normal basis multiplier 12 of FIG. 1, for use with general normal basis and ONB, respectively. The enhanced normal basis multiplier 12 of FIG. 2A includes two rotators 22, 24 and a word multiplier 26. The first rotator 22 takes the first input field element a and outputs a value A, which is a rotated representation of a. Similarly, the second rotator 24 takes the second input field element b and outputs a value B, which is a rotated representation of b. The word multiplier 26 takes the rotated representations A, B, and the multiplication index from generator 14 as inputs and outputs the product c=ab. The normal basis multiplier 12 of FIG. 2A is used in the case of a general normal basis, and in this case, the multiplication index is an m-by-m matrix. The normal basis multiplier 12' of FIG. 2B is used in the case of an ONB, and also includes rotators 22, 24 and word multiplier 26 as in FIG. 2A. In the ONB case, the multiplication index is represented in a more compact way using an array called mult-array with only 2m−1 entries.

Figure 3:
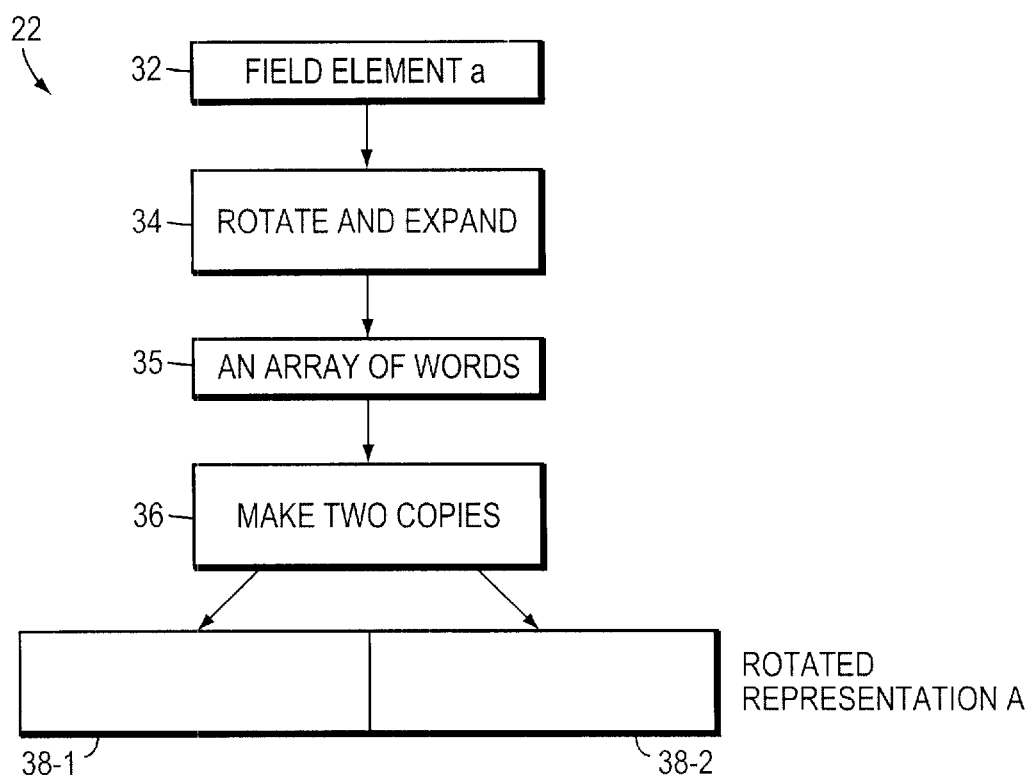
FIG. 3 shows an illustrative embodiment of a rotator suitable for use in the normal basis multipliers of FIGS. 2A and 2B.

FIG. 3 shows an illustrative embodiment of the rotator 22 of FIGS. 2A and 2B. The rotator 22 takes a field element a, as shown generally at 32, and rotates/expands it, in a rotate and expand operation 34, into an array of words 35, each of which has the same length (typically the length of a compute word). The rotator 22 in an operation 36 then makes two identical copies 38-1 and 38-2 of the array of words 35 to produce the rotated representation A. Alternative embodiments of the rotator are possible. For example, the copying operation 36 may be omitted in an alternative embodiment.

Figure 4A:
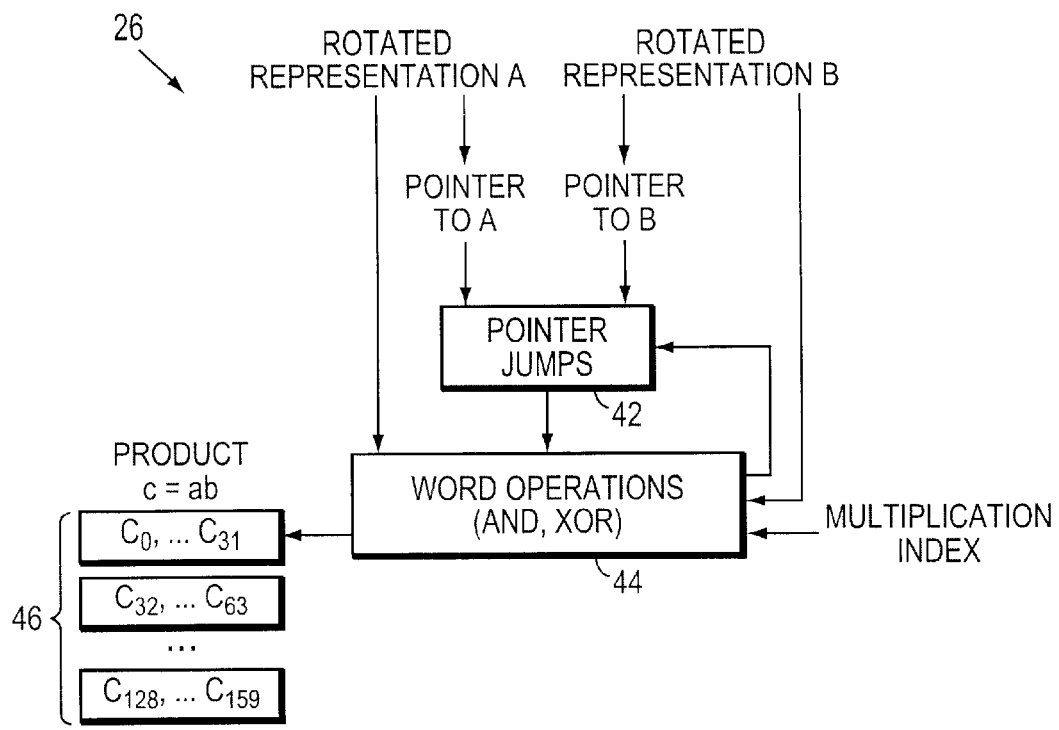
FIGS. 4A and 4B show illustrative embodiments of word multipliers for use in the enhanced normal basis multipliers of FIGS. 2A and 2B, respectively.
Figure 4B:
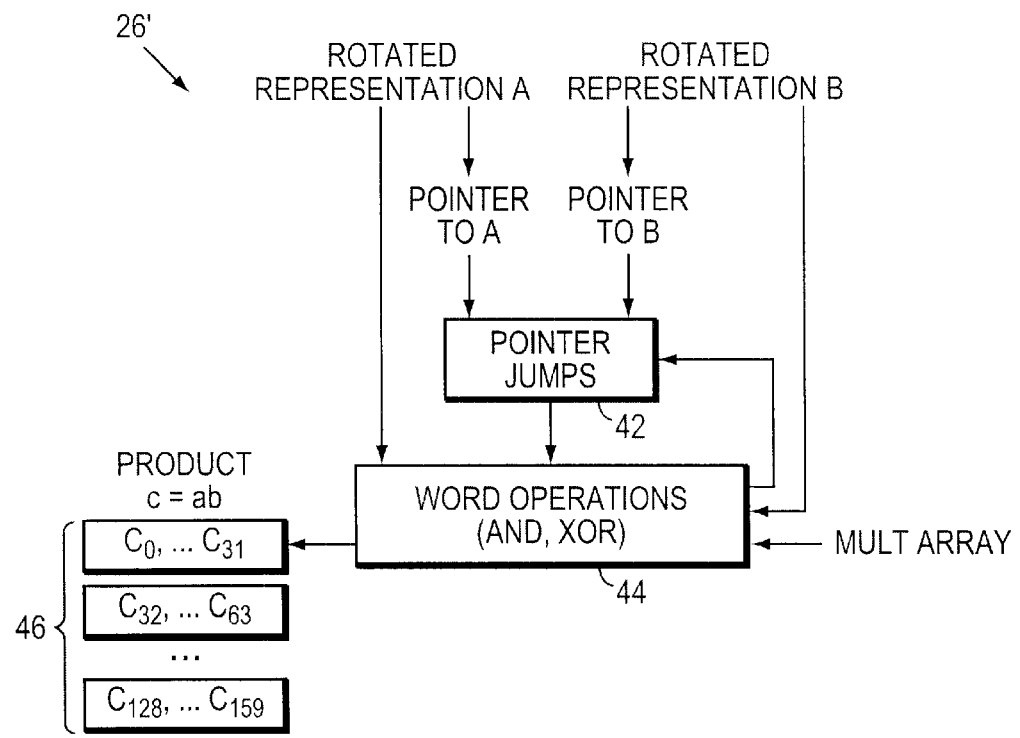

FIGS. 4A and 4B show illustrative embodiments of the word multiplier in the normal basis multipliers of FIGS. 2A and 2B, respectively. The word multiplier 26 of FIG. 4A is for use in the general normal basis case. The product c is computed one word at a time in a sequence of operations 42 which includes AND and XOR operations. In each step, the pointer to the rotated representation A and the pointer to the rotated representation B are first set to the desired location of A and B, respectively. Then, the rotated representations A and B, the two pointers to A and B, and the multiplication index from generator 14 are processed to produce one word of the product c. Pointer jumps are provided as shown in operation 42. The set of words comprising the product c are shown generally at 46. The word multiplier 26' of FIG. 4B is for use in ONB case. In this case, the above-noted mult-array is used in the word operations 44.

Figure 5:
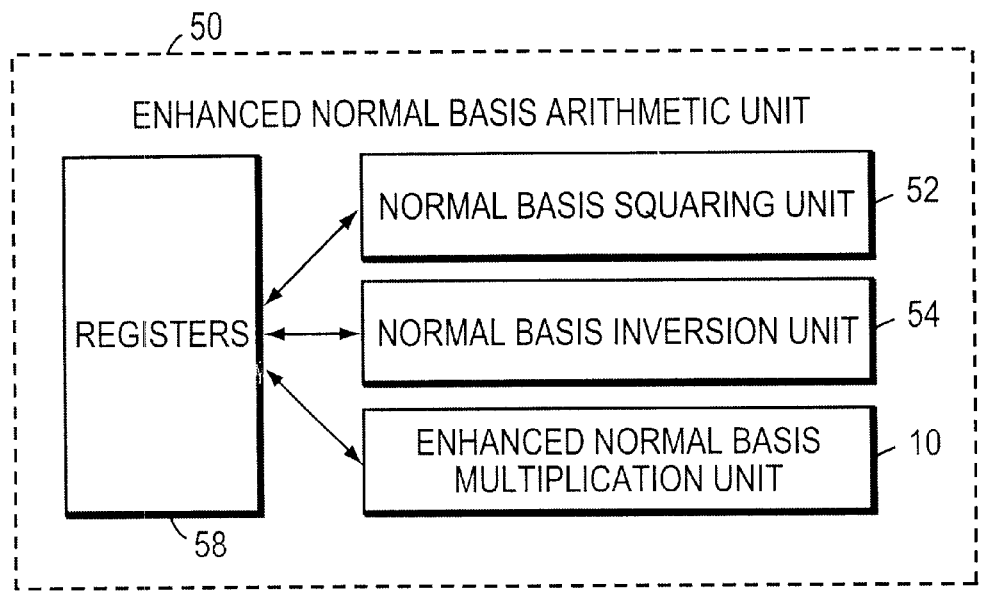
FIG. 5 shows an illustrative embodiment of an enhanced normal basis arithmetic unit in accordance with the invention, incorporating an enhanced normal basis multiplication unit such as that shown in FIG. 1.
Figure 6:
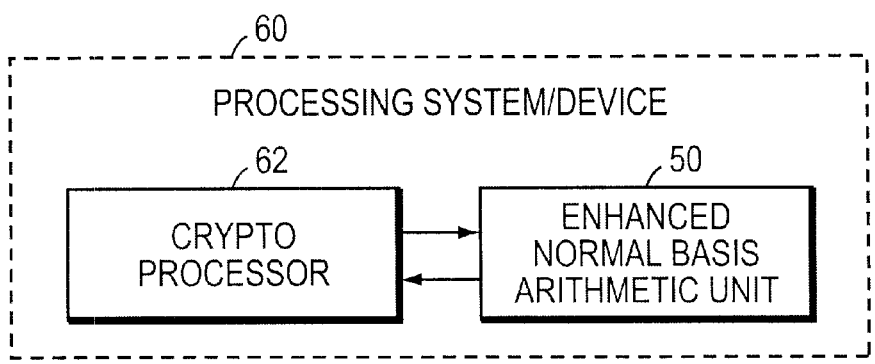
FIG. 6 shows an illustrative embodiment of a processing system/device incorporating the enhanced normal basis arithmetic unit of FIG. 5.

FIGS. 5 and 6 show exemplary applications of a normal basis multiplication unit in accordance with the invention. Many public-key cryptosystems are based on operations in finite fields. Two major classes of such cryptosystems are conventional discrete logarithm cryptosystems and elliptic curve cryptosystems. The present invention is very useful for providing performance improvements in these and other types of cryptosystems. FIG. 5 shows an enhanced normal basis arithmetic unit 50 which includes the enhanced normal basis multiplication unit 10 of FIG. 1, a normal basis squaring unit 52, and a normal basis inversion unit 54. The units 10, 52 and 54 are coupled to a memory in the form of a set of registers 58. It should be noted that the normal basis multiplication unit 10 and the elements thereof, and the other units of arithmetic unit 52 and their corresponding elements, may be configured as software modules executed by a processor, as separate dedicated hardware modules, or as various combinations of software and hardware. Many other configurations of elements utilizing the normal basis multiplication unit 10 will be apparent to those skilled in the art.

FIG. 6 shows a processing system or device 60 which includes the enhanced normal basis arithmetic unit 50 coupled to a cryptographic processor 62, in order to support cryptographic operations (e.g., ECDSA) in normal basis. The system or device 60 may also include other elements, e.g., a memory or other processing elements, arranged in a conventional manner. The system or device 60 may represent, for example, a user terminal in a cryptographic system, such as a personal desktop or portable computer, microcomputer, mainframe computer, workstation, telephone, personal communication device, pager, palmtop computer, digital notepad, television set top box or any other type of processing or communication terminal, as well as portions or combinations of such systems and devices. The processing system or device 60 may include or be comprised of a microprocessor, central processing unit (CPU), application-specific integrated circuit (ASIC) or any other suitable digital data processor. The term "processor" as used herein is intended to include these and other types of systems or devices.

The invention can be used in systems or devices which operate in conjunction with data transfer over a global computer network such as the Internet, a wide area network (WAN), a local area network (LAN), a satellite network, a telephone or cable network, or various combinations of these and other types of networks, using conventional data transfer techniques including but not limited to asynchronous transfer mode (ATM), synchronous optical network/ synchronous digital hierarchy (SONET/SDH) and/or transmission control protocol/Internet protocol (TCP/IP). Additional details regarding cryptographic applications of the normal basis multiplication techniques of the invention may be found, for example, in U.S. application Ser. No. 08/851,045 filed on May 5, 1997 and entitled "Methods and Apparatus for Efficient Finite Field Basis Conversion."

The normal basis multiplication techniques, systems and devices described herein are exemplary and should not be construed as limiting the present invention to any particular embodiment or group of embodiments. For example, although the illustrative embodiments described above are well suited for use in software configured to run on a conventional computer with a 32-bit or 64-bit processor, the invention can be implemented in computers or other systems or devices with a other word lengths, including, e.g., embedded systems such as pagers, digital notepads or palmtop computers with 8-bit processors. As another example, although the illustrative embodiments involve multiplication of two field elements, the techniques of the invention can be extended in a straightforward manner to multiplication of more than two field elements. These and numerous alternative embodiments within the scope of the appended claims will be readily apparent to those skilled in the art.

What is claimed is:

1. An apparatus for multiplying signals represented in a normal basis for a finite field, the apparatus comprising:
   a first rotator receiving a first input signal representative of a first normal basis element;
   at least one additional rotator, each receiving an input signal representative of a corresponding additional normal basis field element; and
   a word multiplier operative to receive output signals from the first and additional rotators, corresponding to rotated digital representations of the first and additional elements, respectively, and to process the rotated representations w bits at a time to generate an output signal representative of a product of the first and additional elements, where w is a word length which is associated with the word multiplier and which is selected independently of the degree of the finite field.

2. The apparatus of claim 1 wherein the at least one additional rotator includes a second rotator receiving a second input signal representative of a second element, and the output signal generated by the word multiplier is representative of a product of the first and second elements.

3. The apparatus of claim 2 wherein the rotated representation of the first element is given by $A[i]=(a_i\ a_{i+1}\ \ldots\ a_{i+w-1})$, the rotated representation of the second element is given by $B[i]=(b_i\ b_{i+1}\ \ldots\ b_{i+w-1})$, and the product is given by $c=(C[0], C[w], C[2w], \ldots, C[m-w])$, where $C[i]=(c_i\ c_{i+1}\ \ldots\ c_{i+w-1})$, m is the degree of the finite field, and $i=0, 1, \ldots m-1$.

4. The apparatus of claim 3 wherein the product $c=(C[0], C[w], C[2w], \ldots, C[m-w])$ is computed by repeating the following computation for t from 0 to (m/w−1):

$$C[wt]=\Sigma_{i=0,\ldots,m-1}A[(i+wt)\bmod m]\bullet(\Sigma_{j=0,\ldots,m-1}M[i,j]\bullet B[(j+wt)\bmod m]),$$

where • represents an AND operation between two words, Σ represents an exclusive-or operation between two words, and M[i,j] is the multiplication matrix of the normal basis.

5. The apparatus of claim 4 wherein A[i] and B[i] are precomputed and stored for $i=0, 1, \ldots m-1$.

6. The apparatus of claim 3 wherein the product $c=(C[0], C[w], C[2w], \ldots, C[m-w])$ is computed as follows:

for t from 0 to (m/w−1)

$C[wt]=0$ for i from 0 to m for t from 0 to (m/w−1)

$$C[wt]=C[wt]\oplus(A[(i+wt)\bmod m]\bullet(\Sigma_{j=0,\ldots,m-1}M[i,j]\bullet B[(j=wt)\bmod m]))$$

where • represents an AND operation between two words, Σ and ⊕ both represent exclusive-or operations between two words, and M[i,j] is the multiplication matrix of the normal basis.

7. The apparatus of claim 6 wherein A[i] and B[i] are precomputed and stored for $i=0, 1, \ldots m-1$.

8. The apparatus of claim 3 wherein $A[i+m]=A[i]=(a_i\ a_{i+1}\ \ldots\ a_{i+w-1})$, $B[i+m]=B[i]=(b_i\ b_{i+1}\ \ldots\ b_{i+w-1})$, array A is precomputed as $A[0], A[1], \ldots, A[m-1], A[m], A[m+1], \ldots, A[2m-1]$, and array B is precomputed as $B[0], B[1], \ldots, B[m-1], B[m], B[m+1], \ldots, B[2m-1]$, such that each of array A and B include 2m elements of length w.

9. The apparatus of claim 8 wherein words 0 through m−1 in A and B are used in computing C[0], words w through w+m−1 in A and B are used in computing C[w], and the remaining elements $C[2w], \ldots, C[m-w]$ of the product c are computed in the same manner.

10. The apparatus of claim 1 wherein the word multiplier further comprises a multiplication index input and wherein the apparatus further comprises a multiplication index generator having an output coupled to the multiplication index input of the word multiplier.

11. The apparatus of claim 10 wherein the multiplication index generator generates a multiplication index which is an m-by-m multiplication matrix M, wherein m is the degree of the finite field.

12. The apparatus of claim 10 wherein the normal basis is an optimal normal basis, and wherein the multiplication index generator generates a multiplication index which is an array with 2m−1 entries, corresponding to a compact representation of a multiplication matrix M, where m is the degree of the finite field.

13. A method for use in a processor for multiplying signals represented in a normal basis for a finite field, the method comprising:
   receiving a first input signal representative of a first normal basis field element;
   receiving at least one additional input signal representative of a corresponding additional normal basis field element;
   generating rotated digital representations of the first and additional elements; and
   processing the rotated representations w bits at a time to generate an output signal representative of a product of the first and additional elements, where w is a word length which is associated with the processor and which is selected independently of the degree of the finite field.

14. An article of manufacture comprising a machine-readable medium containing one or more programs for multiplying signals represented in a normal basis for a finite field, which when executed on a processor, implement the steps of:
   receiving a first input signal representative of a first normal basis field element;
   receiving at least one additional input signal representative of a corresponding additional normal basis field element;
   generating rotated digital representations of the first and additional elements; and processing the rotated representations w bits at a time to generate an output signal representative of a product of the first an additional elements, where w is a word length which is associated with the processor and which is selected independently of the degree of the finite field.

15. An apparatus for multiplying signals represented in a normal basis for a finite field, the apparatus comprising:

a normal basis multiplication unit comprising a first rotator receiving a first input signal representative of a first normal basis field element; at least one additional rotator, each receiving an input signal representative of a corresponding additional normal basis field element; and a word multiplier operative to receive output signals from the first and additional rotators, corresponding to rotated digital representations of the first and additional elements, respectively, and to process the rotated representations w bits at a time to generate an output signal representative of a product of the first and additional elements, where w is a word length which is associated with the word multiplier and which is selected independently of the degree of the finite field;

at least one of a normal basis inversion unit and a normal basis squaring unit; and a memory associated with at least the multiplication unit.

16. An apparatus for multiplying signals represented in a normal basis for a finite field, the apparatus comprising:

a normal basis multiplication unit comprising a first rotator receiving a first input signal representative of a first normal basis field element; at least one additional rotator, each receiving an input signal representative of a corresponding additional normal basis field element; and a word multiplier operative to receive output signals from the first and additional rotators, corresponding to rotated digital representations of the first and additional elements, respectively, and to process the rotated representations w bits at a time to generate an output signal representative of a product of the first and additional elements, where w is a word length which is associated with the word multiplier and which is selected independently of the degree of the finite field; and a cryptographic processor for implementing one or more cryptographic operations utilizing the normal basis multiplication unit.

* * * * *